United States Patent
Baek et al.

(10) Patent No.: US 9,052,029 B2
(45) Date of Patent: Jun. 9, 2015

(54) APPARATUS AND METHOD FOR CONTROLLING ACTUATOR THAT CONTROLS OPENING AND CLOSING OF INTAKE VALVE

(75) Inventors: Sang Chul Baek, Gyeonggi-do (KR); Min Yong Park, Gyeonggi-do (KR); Ho Sung Kim, Gyeonggi-do (KR); Jin Kyu Kim, Gyeonggi-do (KR); Byeong Kook Han, Gyeonggi-do (KR); Byoung Ook Son, Gyeonggi-do (KR); Kyoung Won Kim, Seoul (KR)

(73) Assignees: Hyundai Motor Company, Seoul (KR); Kia Motors Corporation, Seoul (KR); Daesung Electric Co., Ltd., Ansan, Gyeonggi-do (KR); Leehan Corporation, Suwon, Gyeonggi-do (KR)

( * ) Notice: Subject to any disclaimer, the term of this patent is extended or adjusted under 35 U.S.C. 154(b) by 180 days.

(21) Appl. No.: 13/595,129

(22) Filed: Aug. 27, 2012

(65) Prior Publication Data

US 2013/0147466 A1    Jun. 13, 2013

Related U.S. Application Data

(63) Continuation-in-part of application No. 13/552,043, filed on Jul. 18, 2012.

(30) Foreign Application Priority Data

Dec. 12, 2011   (KR) .................. 10-2011-0133209

(51) Int. Cl.
*G01B 7/30*       (2006.01)
*G01R 33/07*      (2006.01)
(Continued)

(52) U.S. Cl.
CPC .......... *F16K 37/0033* (2013.01); *F02D 11/106* (2013.01); *G01D 5/145* (2013.01); *F02D 9/105* (2013.01); *F02D 9/1065* (2013.01); *F16K 31/04* (2013.01)

(58) Field of Classification Search
CPC ........................................................ G01B 7/30
USPC ........................................... 324/207.2, 207.25
See application file for complete search history.

(56) References Cited

U.S. PATENT DOCUMENTS

| 7,477,052 B2 * | 1/2009 | Schmidt ................... 324/207.25 |
| 2001/0009366 A1 * | 7/2001 | Kono et al. ................. 324/207.2 |
| 2009/0283069 A1 * | 11/2009 | Hellinger et al. ............. 123/337 |
| 2011/0068648 A1 | 3/2011 | Ananthakrishna |

FOREIGN PATENT DOCUMENTS

| JP | 2006-170041 A | 6/2006 |
| KR | 10-2006-0043320 A | 5/2006 |
| KR | 10-2007-0103853 A | 10/2007 |

(Continued)

*Primary Examiner* — Bot Ledynh
(74) *Attorney, Agent, or Firm* — Mintz Levin Cohn Ferris Glovsky and Popeo, P.C.; Peter F. Corless

(57) ABSTRACT

Disclosed is an apparatus for controlling an actuator that controls opening and closing of an intake valve. The apparatus includes an input shaft connected to a motor and an output shaft rotatable in conjunction with the input shaft, a magnet unit including a first magnet and a second magnet provided on concentric circles, the first magnet provided such that different poles are alternately arranged at an angle of 90° and the second magnet provided such that different poles are alternately arranged at a predetermined angle, and a control unit, wherein a change in polarities of the first and second magnets are sensed.

10 Claims, 3 Drawing Sheets

(51) Int. Cl.
*F16K 37/00* (2006.01)
*F02D 11/10* (2006.01)
*G01D 5/14* (2006.01)
*F02D 9/10* (2006.01)
*F16K 31/04* (2006.01)

(56) References Cited

FOREIGN PATENT DOCUMENTS

KR 10-2009-0120598 A 11/2009
KR 10-2010-0051289 A 5/2010

* cited by examiner

APPARATUS AND METHOD FOR CONTROLLING ACTUATOR THAT CONTROLS OPENING AND CLOSING OF INTAKE VALVE

CROSS-REFERENCE TO RELATED APPLICATION

This application is a continuation-in-part of U.S. application Ser. No. 13/552,043, filed on Jul. 18, 2012, which claims priority to and the benefit of Korean Patent Application No. 10-2011-0133209 filed in the Korean Intellectual Property Office on Dec. 12, 2011, the entire contents of which are incorporated herein by reference.

BACKGROUND OF THE INVENTION

1. Field of the Invention

The present invention relates to an apparatus and method for controlling an actuator that controls the opening and closing of an intake valve. More particularly, it relates to an apparatus and method that controls the actuator such that the intake valve opens and closes depending on the operating conditions of an engine. The present invention makes it possible to simplify the actuator structure and, thus, reduces design costs associated therewith, and further improves the control precision of the actuator.

2. Description of the Related Art

Recently, various efforts have been made to improve the power and efficiency of a vehicle engine. These efforts have included the attempt to improve intake efficiency by adjusting the shape of an intake manifold and by controlling the timing at which an intake valve opens and closes.

FIG. 1 illustrates an actuator installed in the intake manifold to control the timing at which the intake valve opens and closes. As shown, the actuator includes a casing 100 that is fastened to the intake manifold. The casing houses a drive motor 2 provided with a pinion gear 24 on a drive shaft, a two-step gear part 4 including a plurality of gear parts and having a shaft coupled to the inside of the casing 100, a valve gear part 6 engaged with the two-step gear part 4 and provided with a valve shaft 400 as a central shaft, and a sensor part 8 installed in a portion of the valve gear part 6 and configured to sense the angle of rotation of the valve shaft 400. Here, the sensor part 8 is installed within the casing 100 to correspond to a magnet 64, and is implemented using a hall element 82.

In particular, after a displacement between the magnetic fields of the hall element 82 and the magnetic fields of the magnet 64 in the valve gear part, a control unit calculates the displacement. Based on the calculated displacement, the control unit determines whether to drive the drive motor 2 and, if so, in which direction the driver motor 2 is to be driven.

However, while the various components of such an actuator, such as a rotary magnet and a sensor, generate linear outputs which increases resolution (precision), they are relatively expensive.

On the other hand, while relatively inexpensive elements, such as a hall element, can be used, the resolution (precision) of the resulting products may be deteriorated.

The foregoing is intended merely to aid in the better understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the prior art, and an object of the present invention is to provide an apparatus and method for controlling an actuator that controls the opening and closing of an intake valve, particularly by controlling the opening and closing timing of the intake valve depending on the operating conditions of an engine. The present apparatus and method can, thus, optimize intake inflow.

Another object of the present invention is to provide an apparatus and method for controlling an actuator that controls the opening and closing of an intake valve, particularly by controlling the degree to which the intake valve opens and closes. According to the present invention, price competitive sensing parts can be used to reduce the costs, and the control precision of the actuator can also be improved.

In order to accomplish the above objects, according to one aspect, the present invention provides an apparatus for controlling an actuator that controls opening and closing of an intake valve. The apparatus can include an input shaft connected to a motor and which can be rotatably driven in a forward and reverse direction; an output shaft provided so as to be rotatable in conjunction with the input shaft, and being provided with a first end connected to an intake valve, so that manipulation of the output shaft opens and closes the intake valve; a magnet unit provided at a second end of the output shaft and being rotatable in conjunction with the output shaft, the magnet unit including a first magnet and a second magnet arranged on concentric circles, wherein the first magnet is disposed such that different poles are alternately arranged at an angle of 90°, and the second magnet is arranged such that different poles are alternately arranged at a predetermined angle at which an angle of rotation is desired to be controlled; and a control unit provided on a portion of the magnet unit and configured such that a first hall sensor is installed in a rotational section of the first magnet to sense a change in polarity of the first magnet with rotation of the magnet unit, and such that a second hall sensor and a third hall sensor are installed in a rotational section of the second magnet to sense a change in polarity of the second magnet with the rotation of the magnet unit, wherein when one of the second hall sensor or the third hall sensor is located at a boundary between different poles the other is located at a center of any pole.

Preferably, when the first hall sensor is located at a boundary between different poles of the first magnet, one of the second or third hall sensors may be located at a boundary between different poles of the second magnet.

Preferably, the first magnet may be installed only in a section in which the first magnet is sensed by the first hall sensor when the magnet unit is rotated.

Preferably, the first magnet may be installed as a single magnet.

Preferably, the second magnet is installed only in a section in which the second magnet is sensed by the second and third hall sensors when the magnet unit is rotated.

Preferably, the first magnet and the second magnet may be rubber magnets.

Preferably, the hall sensors may be installed to be spaced apart from the first and second magnets by a predetermined distance within a range of magnetic fields of the first and second magnets.

Preferably, the input shaft may be provided with a worm and the output shaft may be provided with a worm wheel formed thereon so that the worm wheel is rotated while being engaged with the worm.

Preferably, the control unit may set, as an absolute location, a location at which the change in the polarity of the first magnet is sensed by the first hall sensor when the magnet unit is rotated.

Preferably, the control unit may determine changes in relative polarities of the second magnet sensed by the second hall sensor and the third hall sensor when the change in the polarity of the first magnet is sensed by the first hall sensor, thus determining a rotational direction of the motor. Other aspects and exemplary embodiments of the invention are discussed infra.

BRIEF DESCRIPTION OF THE DRAWINGS

The above and other objects, features and advantages of the present invention will be more clearly understood from the following detailed description taken in conjunction with the accompanying drawings, in which.

Figure 1:
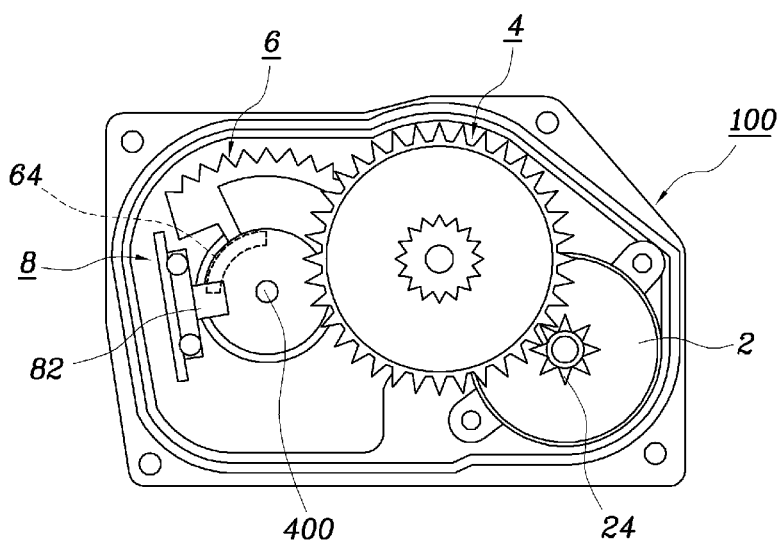
FIG. 1 is a view showing the structure of an actuator installed in a conventional intake manifold.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DESCRIPTION OF THE PREFERRED EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that, unless explicitly described to the contrary, the word "comprise" and variations such as "comprises" or "comprising" specify the presence of stated features, integers, steps, operations, elements, and/or components, but do not preclude the presence or addition of one or more other features, integers, steps, operations, elements, components, and/or groups thereof. In addition, the terms "-er", "-or", and "module" described in the specification mean units for processing at least one function and operation, and can be implemented by hardware components or software components and combinations thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Hereinafter, embodiments of the present invention will be described in detail with reference to the attached drawings.

As shown in FIGS. 2 to 5, an apparatus for controlling an actuator that controls the opening and closing of an intake valve according to an embodiment of the present invention includes an input shaft 10, an output shaft 20, a magnet unit 30, and a control unit 40. The input shaft 10 is connected to a motor 11 and is rotatably driven in a forward or reverse direction. The output shaft 20 is configured and arranged so as to be rotated in conjunction with the input shaft 10, and is provided with one end connected to an intake valve 21 so that manipulation of the output shaft 20 opens and closes the intake valve 21. The magnet unit 30 is provided at the other end of the output shaft 20, and is configured to rotate in conjunction with the output shaft 20. As shown, the magnet unit 30 is provided with a first magnet 31 and a second magnet 32 which are arranged on concentric circles. In particular, the first magnet 31 is disposed such that different poles are alternately arranged at an angle of 90°, and the second magnet is disposed such that different poles are alternately arranged at a predetermined angle at which it is desired to control the angle of rotation. The control unit 40 is provided on a portion of the magnet unit 30 and is configured such that a first hall sensor 41 installed in the rotational section of the first magnet 31 senses a change in the polarity of the first magnet 31 with the rotation of the magnet unit 30, and such that a second hall sensor 42 and a third hall sensor 43 installed in the rotational section of the second magnet 32 senses a change in the polarity of the second magnet 32 with the rotation of the magnet unit 30. In this case, when one of the second hall sensor 42 or the third hall sensor 43 is located at a boundary between different poles, the other is located at the center of any pole.

In particular, the input shaft 10 is coupled to the motor 11, and is rotated in conjunction with the motor 11. The shaft of a driving gear 12 is coupled to an end portion of the motor 11, and a driven gear 13 is disposed so as to be rotated while being engaged with the driving gear 12. In this case, a worm 15 may be formed on the driven gear 13 along the axial direction of the driven gear 13.

Further, the output shaft 20 is configured to transfer the driving force of the motor 11 received from the input shaft 10 to the intake valve 21. The output shaft 20 is coupled to a throttle plate (not shown) for opening and closing the intake valve 21 and is configured to control the opening and closing of the intake valve 21 depending on the rotation of the output shaft 20.

In this case, a worm wheel 25 is formed on the output shaft 20 and is configure and arranged to be capable of rotating while being engaged with the worm 15. The worm wheel 25 may be formed in a fan shape, such that its angle of rotation is limited to 90°.

Furthermore, the magnet unit 30 is fixedly mounted on the top of the output shaft 20, and is configured such that the first magnet 31 is disposed on the inner circle of the concentric circles around the output shaft 20 and the second magnet 32 is installed on the outer circle thereof.

According to an embodiment, the first magnet 31 may be magnetized to four poles and may be configured to sense and control an operation of opening and closing the valve at an angle of 90°. The second magnet 32 may be magnetized to 60 poles and may be configured to sense and control the valve at an angle of 3° (360°/60 poles/2=3°) as a minimum unit. Of course, it is possible to magnetize the first an/or second magnets 31, 32 to more or less poles than that described.

The control unit 40 may be a Printed Circuit Board (PCB), and may be configured such that a first hall sensor 41, the second hall sensor 42, and the third hall sensor 43 are provided. With respect to the installation locations of the second and third hall sensors 42 and 43, if the condition is satisfied that when one of the second or third hall sensors 42 and 43 is located at the boundary between different poles, the other is located at the center of any pole, then the second and third hall sensors 42 and 43 may be freely installed within the section of the second magnet 32.

In particular, as shown in the drawing (FIG. 4), when the second hall sensor 42 is located at the boundary between the N and S poles of the second magnet 32, then the third hall sensor 43 is disposed to be located at the center of the N pole or the S pole of the second magnet 32.

The thus described input shaft 10, output shaft 20, the magnet unit 30 and control unit 40 are installed in a housing 1 to form the actuator.

According to an embodiment of the present invention, when the first hall sensor 41 is located at the boundary between different poles of the first magnet 31, any one of the second hall sensor 42 and the third hall sensor 43 can be provided so as to be located at the boundary between different poles of the second magnet 32.

In particular, as shown in the drawing (FIG. 4), when the first hall sensor 41 is located at the boundary between the N pole and the S pole of the first magnet 31, the second hall sensor 42 is located at the boundary between the N pole and the S pole of the second magnet 32. In this case, the third hall sensor 43 is provided so as to be located at the center of the N pole or the S pole of the second magnet 32, as described above.

With this construction, the waveform of a signal sensed by the first hall sensor 41 makes a transition from a high signal to a low signal or from a low signal to a high signal according to the change in the polarity of the first magnet 31. At the same time, the waveform of a signal sensed by the second hall sensor 42 is generated in the form of a square wave signal, the level of which changes to a high signal and a low signal depending on a change in the polarity the second magnet 32. This occurs because the second hall sensor 42 that senses the second magnet 32 is also located at the boundary at which the polarity of the second magnet 32 changes.

Therefore, the angle of rotation and the rotating speed of the magnet unit 30 can be more precisely detected and controlled based on the waveform signal of the second magnet 32 that has been sensed and detected by the second hall sensor 42 with respect to the absolute location at which the pole of the first magnet 31 changes.

According to an embodiment of the present invention, the first magnet 31 may be installed only in a section in which it is sensed by the first hall sensor 41 when the magnet unit 30 is rotated.

According to an embodiment of the present invention, the first magnet 31 may be installed as a single element.

That is, the angle of rotation of the output shaft 20 can be limited to suit the angle at which the throttle plate of the intake valve 21 is rotated. Since the magnet unit 30, which is fastened to the output shaft 20, is also rotated only within the predetermined angle of rotation, the first magnet 31 may be installed within the angle of rotation at which the first hall sensor 41 senses the first magnet 31, and does not need to be installed within the rotational section in which the first hall sensor 41 does not perform sensing.

In particular, according to the described embodiment, the first magnet 31 measures and sets the absolute location of the output shaft 20. If only a single first magnet 31 composed of poles at an angle of 90° is installed in the section in which the first hall sensor 41 senses the first magnet 31, then a pulse signal, the level of the waveform of which changes, is generated at an end portion of the first magnet 31. In particular, the pulse signal is generated at a portion in which the sensing starts or ends, thus enabling the setting of an absolute location of the output shaft 20 using the provision of the single first magnet 31.

Therefore, it is possible to minimize/simplify the structure of the first magnet 31, so that the cost and weight of products thus formed can be reduced.

Further, according to the present invention, the second magnet 32 may be installed in only the section in which the second magnet 32 is sensed by the second hall sensor 42 and the third hall sensor 43 when the magnet unit 30 is rotated.

In particular, as described above, the angle of rotation of the output shaft 20 can be limited to suit the angle of rotation of the throttle plate of the intake valve 21. In this case, since the magnet unit 30, which is fastened to the output shaft 20, is also rotated only within the predetermined angle of rotation, the second magnet 32 can be installed within the angle of rotation at which the second hall sensor 42 and the third hall sensor 43 sense the second magnet 32. The second magnet 32, thus, does not need to be installed in the rotational section in which the second hall sensor 42 and the third hall sensor 43 do not sense the second magnet 32.

Therefore, the structure of the second magnet 32 can also be minimized/simplified, thus further reducing the cost and weight of products thus formed.

According to various embodiments of the present invention, each of the first magnet 31 and the second magnet 32 may be a rubber magnet. In particular, the first magnet 31 and the second magnet 32 which are sensed by the first hall sensor 41, the second hall sensor 42, and the third hall sensor 43 may be rubber magnets which are price competitive. As such, the production price of products thus formed may be further reduced.

According to embodiments of the present invention, the hall sensors may be installed so as to be spaced apart from the first magnet 31 and the second magnet 32 by a predetermined distance "d" within the range of magnetic fields of the first magnet 31 and the second magnet 32.

According to embodiments of the present invention, the worm 15 may be provided on the input shaft 10, and the worm wheel 25 may be formed on the output shaft 20 so that the worm wheel 25 is rotated while being engaged with the worm 15.

In particular, the worm 15 and the worm wheel 25 are engaged with each other in the form of a worm gear on the input shaft 10 and on the output shaft 20, thus enabling rotational driving of the output shaft 20 by driving the motor 11. Further, this arrangement can at the same time suppress the rotational driving of the motor 11 in a reverse direction.

In the present invention, the control unit 40 may set the location at which a change in the polarity of the first magnet 31 is sensed by the first hall sensor 41, to an absolute location when the magnet unit 30 is rotated.

In particular, by forming each pole of the first magnet 31 in a fan shape of 90°, a change in the polarity of the first magnet 31 will necessarily be sensed by the first hall sensor 41 during the opening or closing of the valve at an angle of 90°. In this case, the location at the time point at which the polarity change is sensed is set as the absolute location, so that the degree to which the valve opens and closes can be controlled.

In the present invention, when the polarity change of the first magnet 31 is sensed by the first hall sensor 41, the control unit 40 can determine changes in the relative polarities of the second magnet 32 sensed by the second hall sensor 42 and the third hall sensor 43. As such, the rotational direction of the motor 11 can be sensed and determined.

Figure 2:
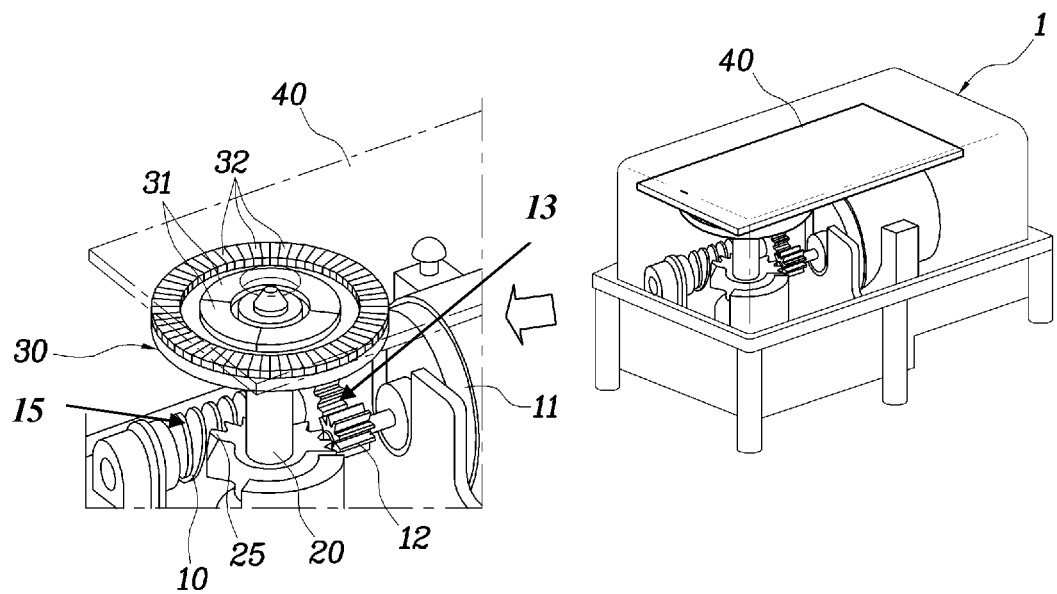
FIG. 2 is an enlarged perspective view showing the external and internal construction of the apparatus for controlling the actuator according to an embodiment of the present invention.
Figure 3:
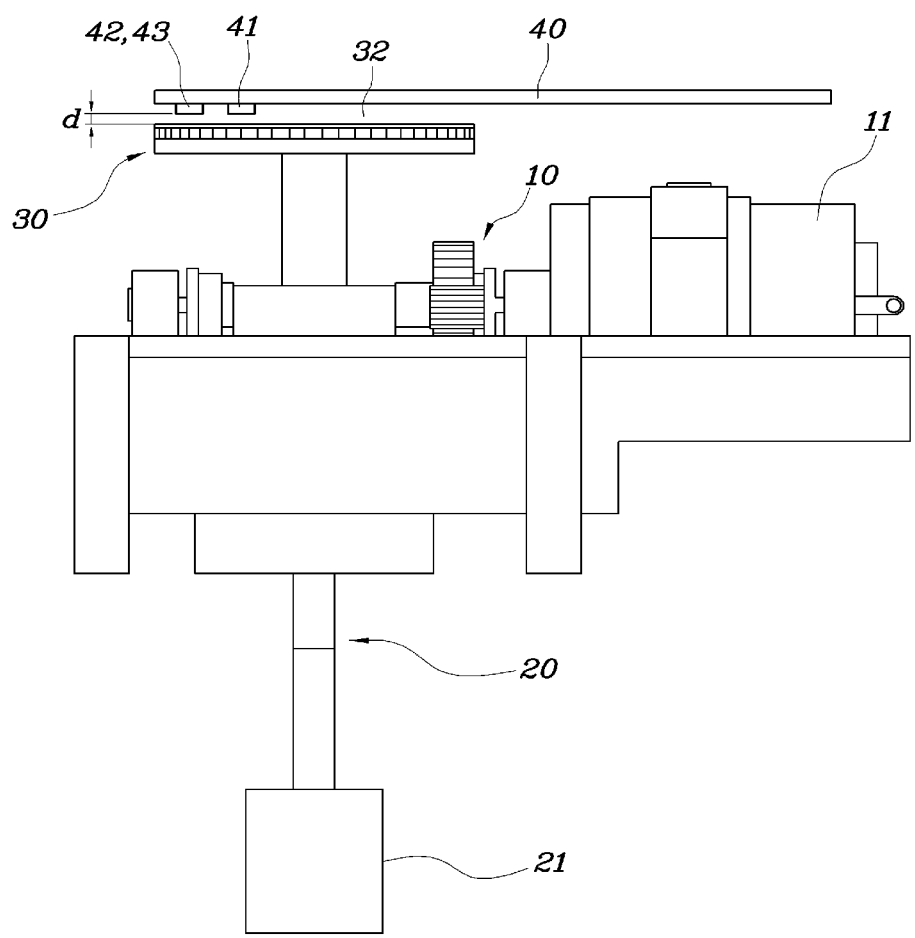
FIG. 3 is a sectional side view showing the apparatus for controlling the actuator according to an embodiment of the present invention.

The operations and effects of the present invention will further be described in detail below with reference to FIGS. 2 and 3.

When the control unit 40 applies a valve opening/closing control value, corresponding to the target performance of an engine, as a signal, the motor 11 is driven in a forward or reverse direction using a Pulse Width Modulation (PWM) control scheme.

In this way, as the input shaft 10 is rotated by the driving of the motor 11, the output shaft 20 is also rotated in conjunction with the input shaft 10. As the magnet unit 30 fastened to the output shaft 20 and the throttle plate of the valve are rotated in conjunction with each other, the amount of air that flows into the intake valve 21 is controlled.

In this case, as the magnet unit 30 is rotated in conjunction with the output shaft 20, changes in the polarities of the first magnet 31 and the second magnet 32 installed in the magnet unit 30 are sensed by the first hall sensor 41, the second hall sensor 42, and the third hall sensor 43. Accordingly, an open/close value for the intake valve 21 is controlled by detecting the angle of rotation, the rotational direction, and the absolute location of the output shaft 20.

Figure 4:
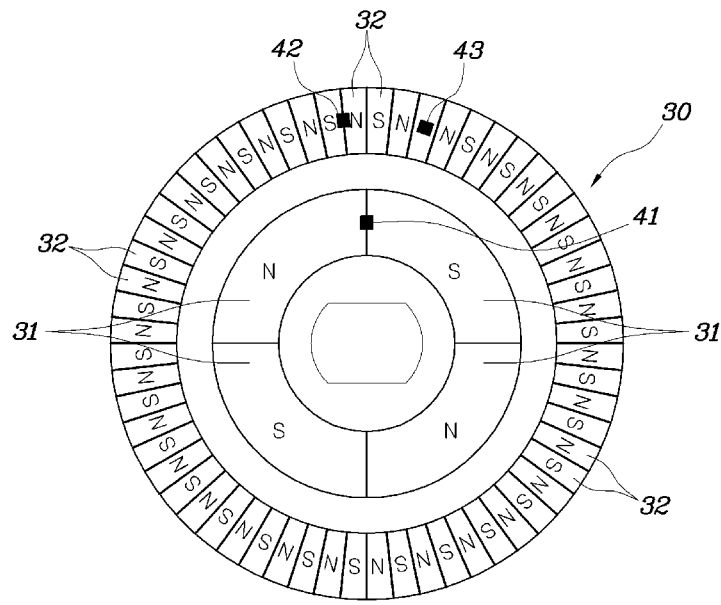
FIG. 4 is a view illustrating the shape of a magnet unit and the locations of hall sensors according to an embodiment of the present invention.
Figure 5:
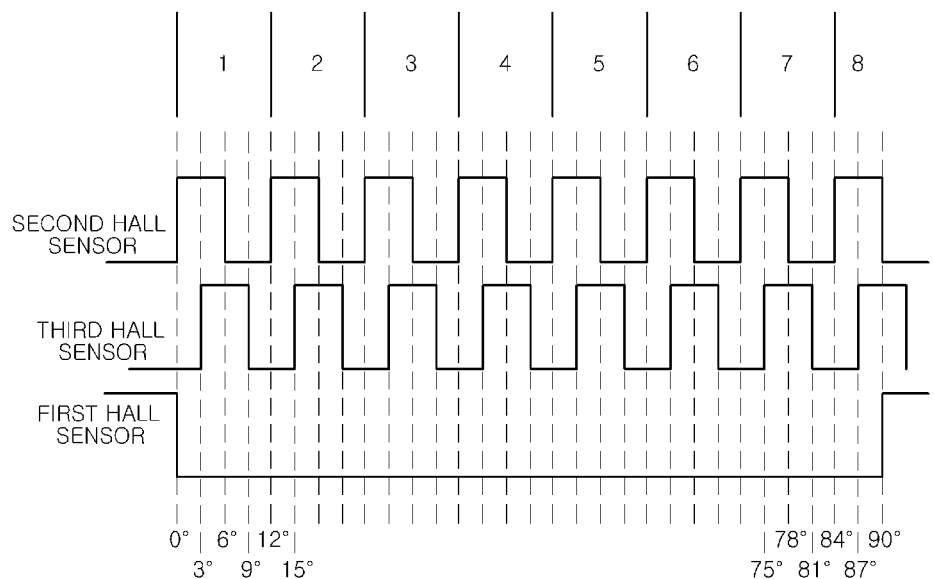
FIG. 5 is a view showing variations in waveform signals depending on the sensing of hall sensors when the magnet unit is rotated according to an embodiment of the present invention.

That is, a detailed description is made with reference to FIGS. 4 and 5. When the magnet unit 30 is rotated counterclockwise when being drawn in the state in which the first hall sensor 41 is located (this location becomes an absolute location) at the boundary between the N and S poles of the first magnet 31, the first magnet 31 is also rotated counterclockwise. By means of this rotation, as the S pole of the first magnet 31 approaches the first hall sensor 41, a waveform signal makes a transition from a high signal to a low signal.

Further, simultaneously with this, the second magnet 32 is also rotated counterclockwise. Then, as the N pole of the second magnet 32 approaches the second hall sensor 42 located at the boundary between the N and S poles of the second magnet 32, the waveform signal makes a transition from a low signal to a high signal. When the polarity changes again from the N pole to the S pole, the waveform signal makes a transition from a high signal to a low signal.

Furthermore, at the location of the third hall sensor 43 which is located at the center of the S pole of the second magnet 32, as the location of the S pole of the second magnet 32 is moved to that of the N pole, the waveform signal makes a transition from a low signal to a high signal. When the polarity of the second magnet 32 changes again from the N pole to the S pole, the waveform signal makes a transition from a high signal to a low signal.

In particular, it is determined whether the signals sensed by the second hall sensor 42 and the third hall sensor are high signals or low signals, on the basis of the absolute location sensed by the first hall sensor 41, thus enabling the direction to be determined.

As described above, the present invention sets the absolute location using the first hall sensor 41, and controls the rotational direction by determining relative waveform signals sensed by the second hall sensor 42 and the third hall sensor 43 at the absolute location. As such, the opening and closing timing of the intake valve 21 can be controlled depending on the operating conditions of an engine, and intake inflow can therefore be optimized.

Further, in the present invention, the first magnet 31 and the second magnet 32 can be provided as rubber magnets which are price competitive, and which are configured and arranged to be sensed and controlled by the first hall sensor 41, the second hall sensor 42, and the third hall sensor 43, thus reducing the production cost of products while improving the control precision of the actuator.

As described above, the present invention can advantageously set an absolute location using a first hall sensor, and ca control a rotational direction by determining relative waveform signals sensed by a second hall sensor and a third hall sensor at the absolute location. As such, the opening and closing timing of an intake valve can be controlled depending on the operating conditions of an engine, and intake inflow can be optimized.

Further advantages because the first magnet and a second magnet can be rubber magnets which are price competitive, and can be sensed and controlled by a first hall sensor, a second hall sensor, and a third hall sensor, the production cost of products can be reduced while the control precision of the actuator can be improved.

Although the above exemplary embodiment is described as using a single control unit, it is understood that the above apparatus may also be controlled by multiple controllers or units.

Furthermore, control logic may be further used in connection with the present invention and may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for controlling an actuator that controls opening and closing of an intake valve, comprising:
   an input shaft connected to a motor and being rotatable in a forward and reverse direction;
   an output shaft configured and arranged to be rotatable in conjunction with the input shaft, and being provided with a first end connected to an intake valve, so that manipulation of the output shaft opens and closes the intake valve;
   a magnet unit provided at a second end of the output shaft and configured and arranged to be rotatable in conjunction with the output shaft, the magnet unit including a first magnet and a second magnet provided on concentric circles, wherein the first magnet is configured such that different poles are alternately arranged at an angle of 90° and the second magnet is configured such that different poles are alternately arranged at a predetermined angle at which an angle of rotation is desired to be controlled; and
   a control unit provided on a portion of the magnet unit and configured such that a first hall sensor is provided in a rotational section of the first magnet so as to sense a change in polarity of the first magnet with rotation of the magnet unit, and such that a second hall sensor and a third hall sensor are provided in a rotational section of the second magnet so as to sense a change in polarity of the second magnet with rotation of the magnet unit, wherein when one of the second hall sensor or the third hall sensor is located at a boundary between different poles, the other is located at a center of any pole.

2. The apparatus according to claim 1, wherein when the first hall sensor is located at a boundary between different poles of the first magnet, the second or the third hall sensor is located at a boundary between different poles of the second magnet.

3. The apparatus according to claim 1, wherein the first magnet is provided only in a section in which the first magnet is sensed by the first hall sensor when the magnet unit is rotated.

4. The apparatus according to claim 3, wherein the first magnet is provided as a single magnet.

5. The apparatus according to claim 1, wherein the second magnet is provided only in a section in which the second magnet is sensed by the second and third hall sensors when the magnet unit is rotated.

6. The apparatus according to claim 1, wherein the first magnet and the second magnet are rubber magnets.

7. The apparatus according to claim 1, wherein the hall sensors are configured and arranged to be spaced apart from the first and second magnets by a predetermined distance within a range of magnetic fields of the first and second magnets.

8. The apparatus according to claim 1, wherein the input shaft is provided with a worm and the output shaft is provided with a worm wheel, the worm and the worm wheel being configured and arranged such that the worm wheel is rotated while being engaged with the worm.

9. The apparatus according to claim 1, wherein the control unit is configured to set, as an absolute location, a location at which a change in the polarity of the first magnet is sensed by the first hall sensor when the magnet unit is rotated.

10. The apparatus according to claim 1, wherein the control unit is configured to determine changes in relative polarities of the second magnet sensed by the second hall sensor and the third hall sensor when the change in the polarity of the first magnet is sensed by the first hall sensor, thus determining a rotational direction of the motor.

* * * * *